United States Patent
Wei et al.

(10) Patent No.: US 11,212,734 B2
(45) Date of Patent: Dec. 28, 2021

(54) MOBILE TELECOMMUNICATIONS SYSTEM METHOD, USER EQUIPMENT AND BASE STATION FOR TRANSMITTING ON DEMAND SYSTEM INFORMATION

(71) Applicant: Sony Corporation, Tokyo (JP)

(72) Inventors: Yuxin Wei, Basingstoke (GB); Brian Alexander Martin, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/317,835

(22) PCT Filed: Jul. 21, 2017

(86) PCT No.: PCT/EP2017/068490
§ 371 (c)(1),
(2) Date: Jan. 15, 2019

(87) PCT Pub. No.: WO2018/015540
PCT Pub. Date: Jan. 25, 2018

(65) Prior Publication Data
US 2019/0297562 A1    Sep. 26, 2019

(30) Foreign Application Priority Data
Jul. 22, 2016    (EP) .................................... 16180858

(51) Int. Cl.
*H04W 48/12*    (2009.01)
*H04W 76/27*    (2018.01)
(Continued)

(52) U.S. Cl.
CPC ........... *H04W 48/12* (2013.01); *H04W 48/14* (2013.01); *H04W 72/1268* (2013.01); *H04W 72/14* (2013.01); *H04W 76/27* (2018.02)

(58) Field of Classification Search
CPC . H04W 48/12; H04W 72/14; H04W 72/1268; H04W 48/14; H04W 76/27
See application file for complete search history.

(56) References Cited

U.S. PATENT DOCUMENTS 9,326,185 B2    4/2016  Alisawi
2007/0047493 A1*  3/2007  Park .................. H04W 36/0055
                                               370/331
(Continued)

FOREIGN PATENT DOCUMENTS

CN    104885550 A    9/2015
EP    2642817 A1    9/2013
(Continued)

OTHER PUBLICATIONS

3GPP TSO-RAN WG2 Meeting #94, R2-163371, Nanjing China, May 23-27, 2016, Agenda item:9.4.3.2.3, Source: Samsung , Title: System Information Signalling (Year: 2016).*
(Continued)

*Primary Examiner* — Jeffrey M Rutkowski
*Assistant Examiner* — Chae S Lee
(74) *Attorney, Agent, or Firm* — Xsensus, LLP

(57) ABSTRACT

A mobile telecommunications system method for transmitting on demand system information to a user equipment includes requesting system information, based on a specific radio resource control connection state, and to transmit system information to the user equipment, based on the system information request.

12 Claims, 5 Drawing Sheets

(51) Int. Cl.
*H04W 48/14* (2009.01)
*H04W 72/12* (2009.01)
*H04W 72/14* (2009.01)

(56) References Cited

U.S. PATENT DOCUMENTS

| | | | |
|---|---|---|---|
| 2014/0068098 A1 | 3/2014 | Anchan et al. | |
| 2016/0128006 A1* | 5/2016 | Ji | H04W 48/14 370/350 |
| 2017/0251500 A1* | 8/2017 | Agiwal | H04W 72/0413 |
| 2017/0265165 A1* | 9/2017 | Li | H04W 48/10 |

FOREIGN PATENT DOCUMENTS

| | | |
|---|---|---|
| WO | 2016/048575 A1 | 3/2016 |
| WO | 2017/150863 A1 | 9/2017 |
| WO | 2017/174447 A1 | 10/2017 |

OTHER PUBLICATIONS

3GPP TSG-RAN WG.2 #94, Tdoc R2-163998, Nanjing, P.R.China, May 23-27, 2016, Agenda Item: 9.4.3.2.2, Source: Ericsson, Title: Handling of inactive UEs (Year: 2016).*
3GPP TSO-RAN WG2 Meeting #94, R2-163371, Nanjing China, May 23-27, 2016, Agenda item:9.4.3.2.3, Source: Samsung, Title: System Information Signalling (Year: 2016) (Year: 2016).*
Russian Office Action Dec. 12, 2019 in Russian Application No. 2019104705/08(008890).
International Search Report dated Nov. 3, 2017 for PCT/EP2017/068490 filed on Jul. 21, 2017, 11 pages.
Samsung, "System information Signalling Design in NR", 3GPP TSG-RAN WG2 Meeting #94, R2-163371, Nanjing, China, May 23-27, 2016, 7 pages.
Intel Corporation, "Standalone NR: Discussion on mobility framework", 3GPP TSG RAN WG2 Meeting #94, R2-163582, Nanjing, China, May 23-27, 2016, 6 pages.
Ericsson, "Handling of inactive UEs", 3GPP TSG-RAN WG2 #94, Tdoc R2-163998, Nanjing, P.R.China, May 23-27, 2016, 6 Pages.

* cited by examiner

MOBILE TELECOMMUNICATIONS SYSTEM METHOD, USER EQUIPMENT AND BASE STATION FOR TRANSMITTING ON DEMAND SYSTEM INFORMATION

CROSS-REFERENCE TO RELATED APPLICATIONS

This application is a National Stage Application based on PCT/EP2017/068490, filed on 21 Jul. 2017, and claims priority to European Patent Application No. 16180858.9, filed on 22 Jul. 2016, the entire contents of which being incorporated herein by reference.

TECHNICAL FIELD

The present disclosure generally pertains to a mobile telecommunications system method, user equipment and base station.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so-called Long Term Evolution ("LTE"), which is a wireless communications technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basis LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so-called "virtual cell" or "local cell" or the like. In this concept a cell is served by a user equipment ("UE"), e.g. a mobile phone, a computer, tablet, tablet personal computer or the like, including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been introduced in accordance with the introduction of the IP Multimedia System (IMS) for LTE, and a physical separation between control plane and user plane has been proposed as a possible solution for 5G. Since requirements for the control plane should basically be robustness and wide coverage so as to maintain the service continuity, a macro or anchor base station should provide a link to the control plane. On the other hand, a key performance of the user plane is the efficient spectrum usage in order to improve the cell capacity. However, since the requirements of the user plane highly depend on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as virtual cell should be able to take over responsibilities, which are typically carried out, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell are, for example, radio resource management, radio resource control ("RRC"), connection control, etc. Hence, it is not solely relied on the eNodeB or a small cell to relay data and to organize the local network, but such functions are shifted to the UE function as a virtual cell. The existence of such intermediate nodes of virtual cells in the network are expected to offload signaling overhead from the eNodeB, to allocate radio resource efficiently, etc.

Although there exist signaling techniques for the future 5G technology, it is generally desirable to improve the signaling.

SUMMARY

According to a first aspect, the disclosure provides a mobile telecommunications system method for transmitting on demand system information to a user equipment comprising requesting system information, based on a specific radio resource control connection state; and transmitting system information to the user equipment, based on the system information request.

According to a second aspect, the disclosure provides a user equipment for a mobile telecommunications system comprising circuitry configured to request system information, based on a specific radio resource control connection state.

According to a third aspect, the disclosure provides a base station for a mobile telecommunications system comprising circuitry configured to determine a radio resource control connection state of a user equipment; and transmit system information to the user equipment, based on the system information request.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 4:
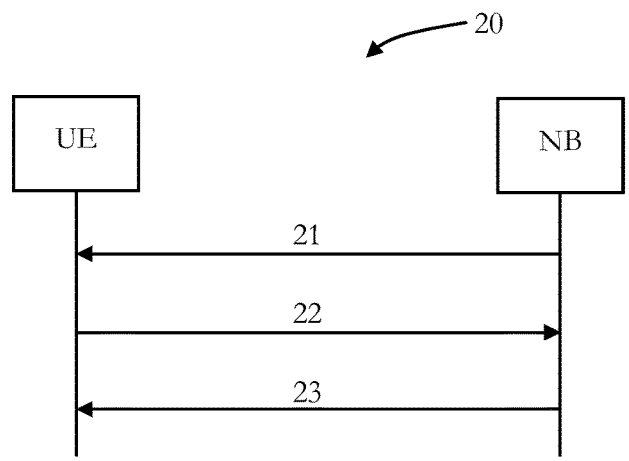
FIG. 4 is a flow diagram for a mobile telecommunications system method for on demand requesting system information of a user equipment in an RRC idle state.

Before presenting a detailed description of the embodiments under reference of FIG. 4, general explanations are made.

As mentioned in the outset, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so called Long Term Evolution ("LTE"), which is a wireless communications technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, deal with features and methods which are already defined in the LTE and LTE-A standard documentation.

5G technologies will allow a concept of a so called "virtual cell" or "local cell", "distributed unit" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to the network preferably in licensed bands.

A logical separation between control plane and user plane has been made in accordance with introduction of the IP Multimedia System (IMS) for LTE, and a physical separation between control plane and user plane has been proposed as a possible solution for 5G. Since requirements for the control plane should basically be robustness and wide coverage so as to maintain the service continuity, a macro or anchor base station, which can also be a central unit or the like, should provide a link to the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as distributed unit, a virtual cell, local cell should be able to take over responsibilities, which are typically carried out, for example, in a base station, or eNodeB (Evolved Node B) as it is referred to in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC"), connection control, etc. Hence, it is not solely relied on the eNodeB or a small cell to relay data and to organize the local network, but such functions are shifted to the UE functioning as a virtual cell.

Moreover, due to the employment of smaller cells, such as a virtual cell, intermediate node and the like, the next generation network, e.g. 5G, may become heterogeneous, since it may include cells with different output power, coverage, operating band, RAT (Radio Access Technology) or the like. Thereby, a flexible cell deployment, which may even be dynamic, may be realized in order to adjust a suitable cell capacity to a dynamically demanded traffic. Generally, it is assumed that the cell capacity may be improved by providing small cells in a high dense manner, wherein such small cells may be, for example, hot spots.

Figure 1:
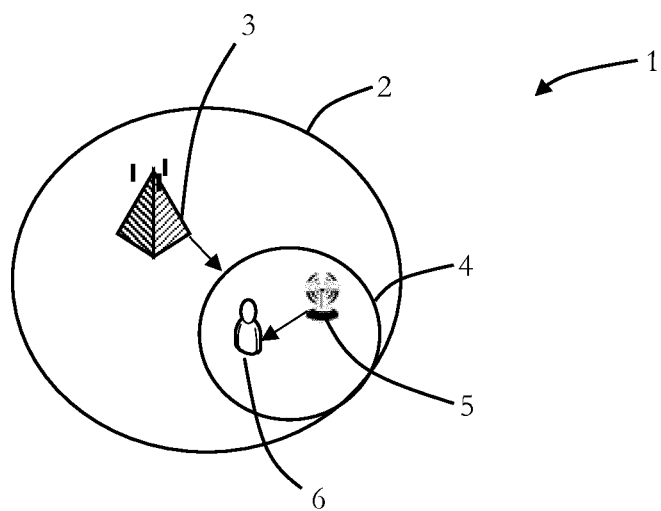
FIG. 1 schematically illustrates a mobile telecommunications system.

In FIG. 1 a mobile telecommunications system or radio access network (RAN) 1 is illustrated. A macro LTE-cell 2 with a base station 3, implemented as eNodeB, is provided, which establishes the macro cell 2. Within the macro cell 2, a new radio cell 4, e.g. based on the future 5G technology, is located. The new radio cell 4 is established by a new radio (NR) base station 5, e.g. a hotspot or the like. A user equipment UE 6 is located within the new radio cell 4. For instance, the new radio cell 4, may be a mmWave cell.

In the 3GPP document R2-163371 "System Information Signalling Design in NR", 3GPP TSG-RAN WG2 Meeting #94, Nanjing, China, 23-27 May 2016, it is discussed that on demand system information provision will be an important complementary method to transmit system information in addition to a conventional broadcast scheme. FIG. 2, i.e.

FIGS. 2a to 2e illustrate proposed broadcast schemes on the basis that LTE approaches shall be reused in the NR (new radio) system.

Figure 2A:
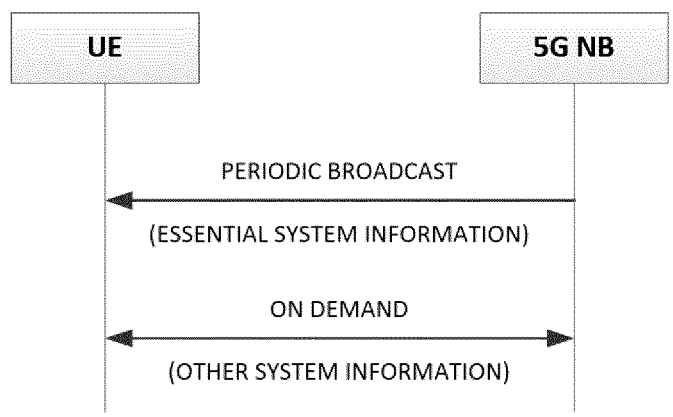
FIGS. 2a-e schematically illustrate approaches for on demand system information.

In order to overcome the issues in periodic broadcast of all system information, R2-163371 proposes that for the stand-alone NR operation the most essential system information required by the UE for camping on the detected cell and subsequently accessing the camped cell is broadcasted while the rest of the system information can be provided to the UE on demand, as it is also illustrated in FIG. 2a, which illustrates a message sent between the UE and the new radio base station NB. Essential system information is exemplary listed in R2-163371 in Annex B.

FIGS. 2b to 2e show four different schemes for requesting (non-essential) system information on demand as proposed in R2-163371. The four approaches of FIGS. 2b to 2e have in common that they only consider a radio resource control (RRC) connection idle state.

Figure 2B:
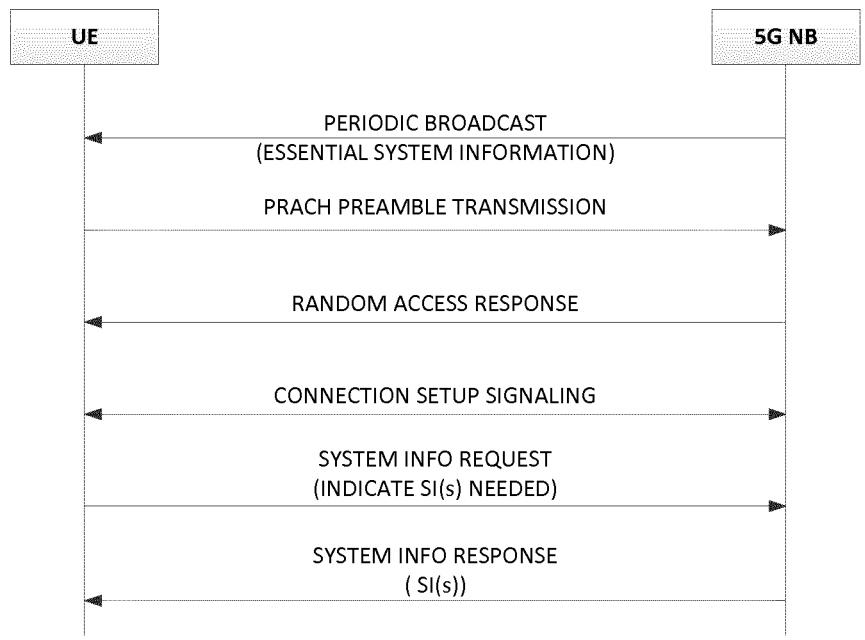

In the approach of FIG. 2b, the UE performs a connection setup procedure and enters the RRC connected state and in the RRC connected state the UE sends its system information request message.

Figure 2C:
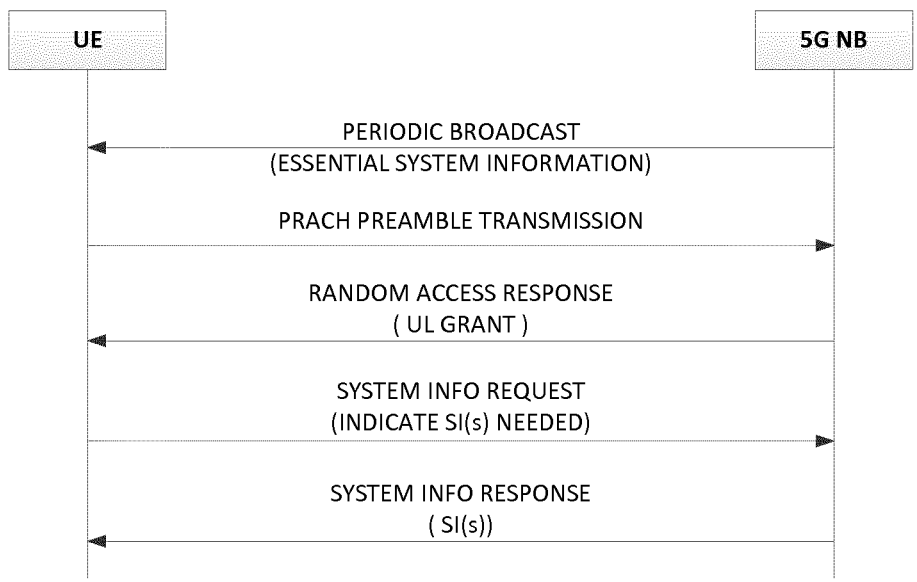

In the approach of FIG. 2c, the UE initiates a random access procedure on the PRACH. Based on the received UL grant in the random access response, the UE sends its system information request message.

Figure 2D:
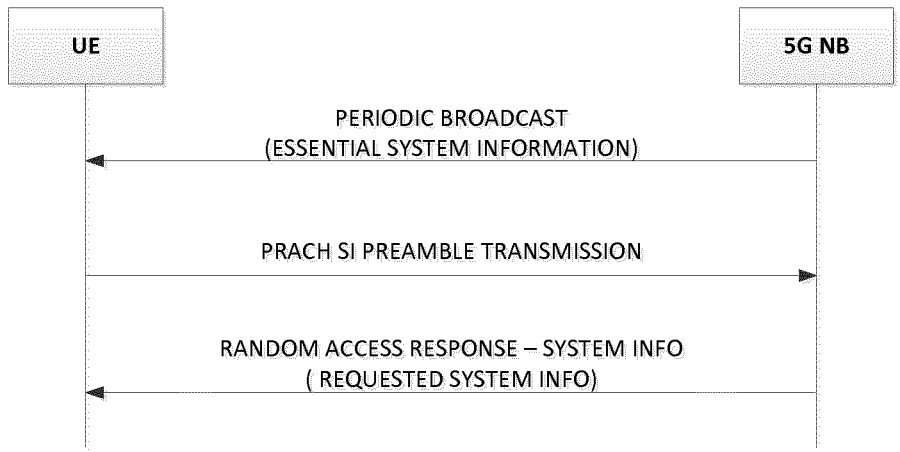

In the approach of FIG. 2d, the UE transmits a PRACH preamble, which is specific to the system information which is requested.

Figure 2E:
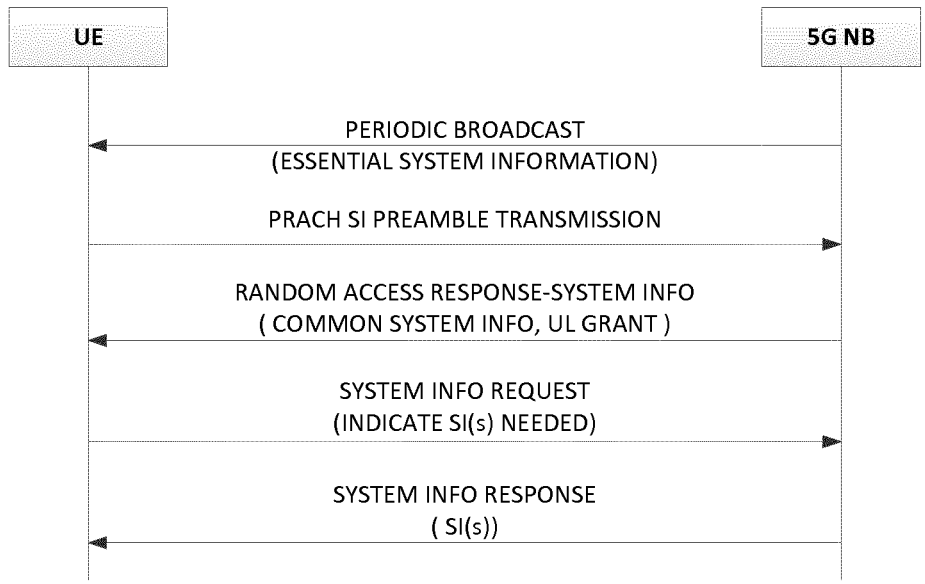

In the approach of FIG. 2e, the UE also transmits a PRACH preamble, which is specific to the system information which is requested. After receipt of a common system information and an UL grant, the UE sends a further system information request.

For NR, a new RRC state, called "RRC CONNECTED Inactive" is under discussion, as can also be exemplary taken from the 3GPP document R2-163998, "Handling of inactive UEs", 3GPP TSG-RAN WG2 #94, Nanjing, P. R. China, 23-27 May 2016 and the 3GPP document R2-163582, "Standalone NR: Discussion on mobility framework", 3GPP TSG RAN WG2 Meeting #94, Nanjing, China, 23-27 May 2016.

NR is aimed at a large range of services and one of them involves sporadic data transmission of small and mid-sized packets that would also benefit from long discontinuous reception (DRX) for power saving. Such a service does not fit well into the existing LTE RRC states and, therefore, the new "RRC CONNECTED Inactive" RRC state is being discussed in 3GPP. It is also proposed that the new state is similar to the "light connected" state being designed for LTE. This procedure still relies on using a RACH procedure, and the Network assigns a new C-RNTI (Cell Radio network Temporary Identity) for every new connection.

Figure 3:
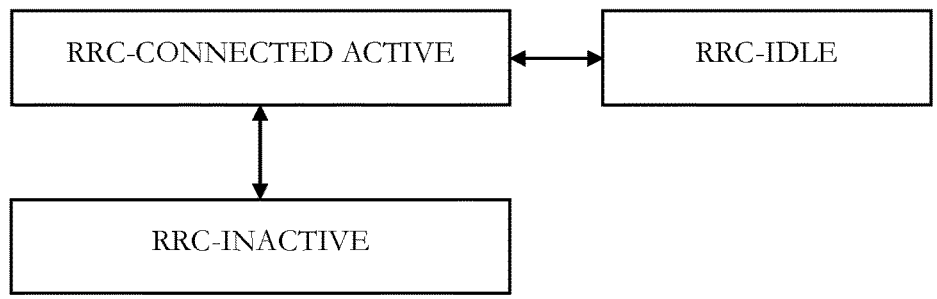
FIG. 3 schematically illustrates radio resource control connection states of embodiments.

FIG. 3 schematically illustrates the RRC states which are implemented in some embodiments, namely the (from LTE) known RRC-CONNECTED ACTIVE state, the RRC-IDLE state and the new RRC-INACTIVE state.

In the above-mentioned 3GPP document R2-163998, the following agreements are made with respect to the new RRC-INACTIVE state for the New Radio (e.g. 5G), which may be summarized as follows:

Functions of LTE RRC are taken as a baseline for NR RRC;

Study the introduction of a RAN controlled "state" characterized by, at least:

UEs in RAN controlled state should incur minimum signaling, minimize power consumption, minimize resource costs in the RAN/CN making it possible to maximize the number of UEs utilizing (and benefiting from) this state Able to start data transfer with low delay (as required by RAN requirements)

Further study whether data transfer is leaving the "state" or data transfer can occur within the "state"

Further study whether "state" translates to an RRC state

Potential characteristics of the RAN controlled "state" for study:

The CN/RAN connection is maintained

AS context stored in RAN

Network knows the UE's location within an area and UE performs mobility within that area without notifying the network.

RAN can trigger paging of UEs which are in the RAN controlled "inactive state"

No dedicated resources

The above proposal assumes that the UE, similar to Idle mode, will monitor the paging channel (hence monitor P-RNTI).

Document R2-163582 mentioned above proposes a RAN routing area (RRA) which is an area within the network in which the UE may perform cell reselection without notifying the network. A RAN anchor eNodeB is defined, similar to the description above, and the RAN pages within the RRA for the UE. RRA can be defined by RAN level, and, hence, may be different from the Tracking Area (TA) in some embodiments, whereas the design principle of the RRA size can be the same for that of the TA size, in some embodiments. In other words, in some embodiments, the size of RRA is a tradeoff between RAN level paging signaling overhead and RRA update signaling overhead.

Consequently, in some embodiments, on demand system information transmission in the so-called inactive RRC state is addressed, but also in the RRC CONNECTED state and in the RRC IDLE state.

Hence, some embodiments pertain to a mobile telecommunications system method for transmitting on demand system information to a user equipment including requesting system information, based on a specific radio resource control connection state; and transmitting system information to the user equipment, based on the system information request. The mobile telecommunications system method may additionally include determining a (specific) radio resource control connection state of the user equipment.

But, in some embodiments, on demand system information transmission does not necessarily mean that the user equipment always sends a system information request in order to get the system information. For example, the network may send the system information to a user equipment without any explicit request, for example, 1) when a cell changes; 2) when system information updates; 3) new service requirement, and/or 4) by another UE's request.

As mentioned above, the user equipment may be a mobile phone, a smartphone, a computer, tablet, tablet personal computer or the like including a mobile communication interface, or any other device which is able to perform a mobile telecommunication via, for example, LTE(-A), such as a hot spot device with a mobile communication interface.

The telecommunications system may be a 5G system as discussed above and the communication may be performed, for example, between the user equipment and a base station, which may be a new radio base station, as discussed above, which may even act in a standalone manner in some embodiments.

The radio resource control connection state of the user equipment may be determined by the user equipment itself. As mentioned, the specific radio resource control (RRC) connection state may be any of the following states, which have been discussed above, connected active, an idle or an inactive state.

The system information, which is requested on demand by the user equipment in some embodiments, may include non-essential system information, in contrast to the essential system information, such as discussed above, which is broadcasted, for example, by the new radio base station.

The request for the on demand system information is based on the determined radio resource control connection state. Hence, in some embodiments, the request differs between different RRC connection states, and, thus, the user equipment may decide, based on the determined RRC connection state, which request scheme it will use for requesting the on demand system information.

The system information is transmitted to the user equipment, e.g. by the (NR) base station, based on the system information request. Hence, either in response to receipt of the request or in response to any other indication that the request has been made, the system information is transmitted to the user equipment. The transmission may be performed by broadcasting, groupcasting, direct (addressed) transmission, transmission in a respective beam serving the user equipment, etc.

In some embodiments, the system information is transmitted based on the determined radio resource control connection state. For example, the (NR) base station determines a transmission scheme, scheduling, transmission channel or the like, based on the determined RRC connection state.

In some embodiments, essential system information including at least one of reserved uplink grant and uplink grant resource pools is broadcasted. This may be performed in anyone of the radio resource control connection states discussed herein. Moreover, the uplink grant and/or the uplink grant resource pools may depend on the specific radio resource control connection state. For example. In the RRC inactive state, the user equipments may use the same resource as in the RRC connected state, while in other embodiments, different resources are used for the RRC connected and the inactive state.

In some embodiments, as mentioned, the specific or determined radio resource control connection state is an idle state. The following discussion pertains to the RRC idle state.

The system information may be requested within a radio resource establishment procedure. For example, the system information request is included in a radio resource control connection request message, e.g. by adding a respective bit or other indication in the request message that the on demand system information is requested, by defining a new establishment cause to indicate it is for a system information request, by adding more bits in the radio resource control connection request message to indicate what specific system information blocks are demanded or the like.

The requested system information may also be transmitted within a radio resource establishment procedure, e.g. included in a radio resource control connection setup message.

As mentioned, in some embodiments, the specific or determined radio resource control connection state is at least one of an inactive state, connected state and idle state. The following discussion mainly pertains to the RRC inactive state, but the discussed contention based schemes can also be applied to the connected state and idle state.

In some embodiments, an uplink resource or uplink resource pool, e.g. an uplink grant (or an uplink grant resource pool) or a communication channel or the like is pre-allocated to the user equipment.

The requesting of the system information may be performed contention based on the pre-allocated resources. In other words, in some embodiments, the system information request is transmitted without performing the PRACH procedure discussed above (this is also true for some embodiments of the other RRC states, namely the connected state and the idle state).

The system information request may include at least one of an indication that system information is requested, indication of system information blocks, service related information, and location related information. Based on this information, it can be determined which kind of and which content of system information is needed for the requesting user equipment.

The system information request may include an identification information for identifying the user equipment which requests the system information. Thereby, in some embodiments, the requested system information transmitted to the user equipment is addressed to the user equipment based on received identification information.

The requesting of system information may be repeated, if after a predetermined time period no acknowledgment is received. The acknowledgment may be transmitted by the NR base station after receipt of the system information request.

The requested system information may be broadcasted or groupcasted, if more than one system information request is received. In such a case further-contention based transmission of system information requests may be avoided and signaling reduced.

In some embodiments, in response to received noise on the pre-allocated resources, non-essential system information is broadcasted. The received noise may be detected by the NR base station or other receiving entity. Such noise may be generated in cases where two or more requests for system information are transmitted simultaneously. Hence, it may be determined, based on the detected noise, that requests for system information may be transmitted, but due to the contention based transmission not received. Thus, non-essential system information is broadcasted, since it may be assumed that two or more user equipments request such on demand system information.

The non-essential system information may include cell reselection system information or other information which is typically not broadcasted in the normal (e.g. essential in the sense as discussed above) system information.

In some embodiments, further essential system information is broadcasted, wherein scheduling information for broadcasting the non-essential system information is included in the essential system information. This may be done, for example, upon detecting of the noise discussed above or, for example, in response to receipt of multiple requests for system information. Hence, by scheduling the broadcast of the non-essential system information, the user equipment can receive the non-essential system information in accordance with the scheduling information.

In some embodiments, the reserved uplink grant or uplink grant resource pools will be included e.g. in the broadcasted essential system information.

In some embodiments, the specific or determined radio resource control connection state is a connected state, as also discussed above. The following discussion pertains to embodiments with a RRC connected state.

The requesting of system information may be performed upon detection of at least one of the following events: new service request, mobility, and new physical layer change. Hence, in cases where the user equipment detects one of the events, it may determine that further system information is needed and, thus, requests the according system information.

The system information request may be transmitted within a radio resource control signaling, e.g. from user equipment to the NR base station.

The system information request may be transmitted within a scheduling request.

In some embodiments, additionally to the scheduling request, a zero buffer size indication is included in a buffer status report following the scheduling request. Thereby, since the buffer size is zero in the buffer status report, it can be determined, e.g. by the NR base station, that further system information is needed.

The scheduling request may include an indication that a system information request is transmitted.

The indication may be implemented by including a respective bit in the scheduling request, by manipulation an existing bit of the scheduling request, or by defining a respective further bit in the scheduling request.

The scheduling request may include information about the requested system information, e.g. the type of system information blocks or the like.

The system information request may be transmitted within a handover procedure, and the requested system information may be transmitted included in a handover command.

Some embodiments pertain to a user equipment for a mobile telecommunications system including circuitry configured request system information, based on a specific radio resource control connection state. The circuitry may be further configured to determine a (specific) radio resource control connection state of the user equipment.

As mentioned above, the user equipment may be a mobile phone, a smartphone, a computer, tablet, tablet personal computer or the like including a mobile communication interface, or any other device which is able to perform a mobile telecommunication via, for example, LTE(-A), such as a hot spot device with a mobile communication interface.

Moreover, the mobile telecommunications system method discussed above can be performed (partially) by the user equipment, and, thus, the above description fully applies to the user equipment.

The specific or determined radio resource control connection state may be an idle state, as discussed above. The system information may be requested within a radio resource establishment procedure, and it may be requested included in a radio resource control connection request message.

The specific or determined radio resource control connection state may be an inactive state, as discussed above, but it may also be a connected state or an idle state. The system information may be requested on a pre-allocated resource or a resource pool. The system information request may include at least one of: indication that system information is requested, indication of system information blocks, service related information, and location related information. The system information request may include identification information for identifying the user equipment which requests the system information. The request of system information may be repeated, if after a predetermined time period no acknowledgment is received.

The specific or determined radio resource control connection state may be a connected state, as discussed above. Requesting system information may be performed upon detection of at least one of: new service request, mobility, and new physical layer change. The system information request may be transmitted within a radio resource control signaling. The system information request may be transmitted within a scheduling request. Additionally to the scheduling request a zero buffer size indication may be included in a buffer status report following the scheduling request. The scheduling request may include an indication that a system information request is transmitted. The scheduling request may include information about the requested system information. The system information request may be transmitted within a handover.

Some embodiments pertain to a base station for a mobile telecommunications system including circuitry configured to determine a radio resource control connection state of a user equipment; and transmit system information to the user equipment, based on the system information request, as also discussed above. The base station may be a new radio base station, as discussed above.

Moreover, the mobile telecommunications system method discussed above can be performed (partially) by the user equipment, and, thus, the above description fully applies to the user equipment.

The system information may be transmitted, based on the determined radio resource control connection state, as discussed above.

As discussed, the circuitry may be further configured to broadcast essential system information including at least one of reserved uplink grant and uplink grant resource pools.

As discussed, in some embodiments, the determined radio resource control connection state is an idle state. The requested system information may be transmitted within a radio resource establishment procedure. The requested system information may be transmitted included in a radio resource control connection setup message.

As discussed, in some embodiments, the determined radio resource control connection state may be an inactive state, but it may also be a connected state and an idle state. An uplink resource or uplink resource pool may be pre-allocated to the user equipment by the base station. The requesting of the system information may be performed contention based on the pre-allocated resource. The requested system information transmitted to the user equipment may be addressed to the user equipment based on received identification information. The requested system information may be broadcasted or groupcasted, if more than one system information request is received. In response to received noise on the pre-allocated resource, non-essential system information may be broadcasted, which may include cell reselection system information. The circuitry may be further configured to broadcast essential system information, wherein scheduling information for broadcasting the non-essential system information is included in the essential system information.

As discussed, the determined radio resource control connection state may be a connected state. The requested system information may be transmitted included in a handover command.

Hence, briefly summarizing, in some embodiments, by taking different UE states into consideration, on demand system information provision procedures have been provided. For the UEs in the idle state, in some embodiments, the on demand system information request and reply can be sent via the RRC connection establishment procedure. For the UEs in inactive state, in some embodiments, the contention based system information request can be adopted, wherein the contention based system information request can also be adopted for other states, e.g. the connected state and the idle state. For the successful contenders, the following on demand system information may be sent directly to the UE by addressing UE's C-RNTI or tracking area ID. For the UEs in connected state, in some embodiments, the system information request can be sent via scheduling request or via handover command if a handover is triggered.

Returning to FIG. 4, a mobile telecommunications system method 20 for requesting and transmitting on demand system information for a user equipment UE and a 5G new radio base station NB is discussed, wherein the UE is in a RRC connection idle state, as discussed above.

At 21, the NB periodically broadcasts system information, which is, for example, essential system information in the sense as discussed above.

The UE determines that it is in the idle state and that it needs additional system information. Hence, UEs in the RRC_IDLE state send the system information request during or after the "initial access" procedure for additional system information.

In the present embodiment, in order to further reduce the signaling overhead, the system information request is be added at 22 during the RRC connection establishment procedure, i.e. RRCConnectionRequest, wherein the UE indicates the requested SIBs (system information blocks).

The NB, upon receipt of the system information request in the RRC-ConnectionRequest, sends at 23 the requested system information via a reply RRC message, i.e. a RRC-ConnectionSetup message in the present embodiment.

Figure 5:
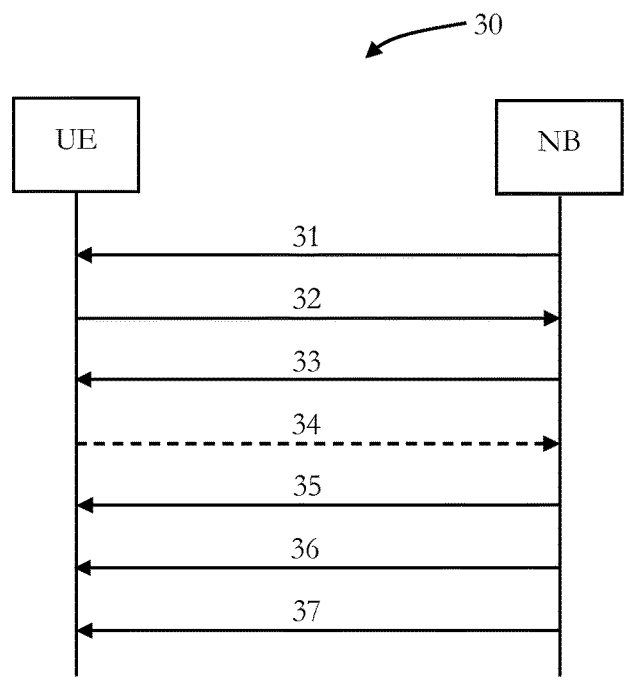
FIG. 5 is a flow diagram for a mobile telecommunications system method for on demand requesting system information of a user equipment in an RRC inactive state.

FIG. 5 illustrates a mobile telecommunications system method 30 for requesting and transmitting on demand system information for a user equipment UE and a 5G new radio base station NB, wherein the UE is in a RRC connection inactive state and the request for system information is transmitted in contention based uplink transmission, as also discussed above.

At 31, the NB periodically broadcasts system information, which is, for example, essential system information in the sense as discussed above.

The UEs in inactive state may determine to send the system information request because of the 1. Cell and/or TRP (transmission point) change and/or reselection
2. Paging with system information update request
3. New service request, e.g. D2D discovery (device to device discovery)
4. Downlink data received and may have uplink data to transmit
5. New cell/TRP is detected or powered on For the UE in inactive state, in the present embodiment, it does not need to transit to the RRC_CONNECTED state for sending the system information request and/or for receiving the requested system information.

The UE in inactive state will be pre-allocated with a UL (uplink) grant or a UL grant resource pool reserved by the network NB in the case that they have uplink data to transmit. Such a reserved UL grant or UL grant resource pools will be transmitted e.g. in the broadcasted essential system information at 31.

All UEs in inactive state will contend for these shared resources by just sending their system information request at 32 on the pre-allocated resource.

In the allocated UL grant, the following information (and their combinations) can be sent at 32:

1. Indication to the network that it demands the non-essential system information.
2. Specific SIBs it demands for e.g. SIB index.
3. Service related and/or location related information to help the network to judge if any additional SI is necessary.

In some embodiments, the more information is contained in the UL grant, the more assistant information for the system information transmission would be contained at the same time, which might result in more resources which have to be reserved and, if the contention fails, more resource wastage might be expected.

The mentioned contention based system information request transmission at 32 is different from the "contention" based (P)RACH procedures as discussed above for FIGS. 2c to 2e.

The contention based system information request transmission of the present embodiment does not need any (P)RACH procedure, since the UE has already pre-allocated UL grant in advance. Hence, the UE directly sends the data, if any data is present. The contention only happens if two or more UEs send the data at the same UL-grant at the same time.

In contrast to this, in FIGS. 2c to 2e, the contention happens when two or more UEs select the same preamble and transmit the same preamble at the same (P)RACH resource block.

The UL system information request sent at 32 can be CRC scrambled by the C-RNTI or the RAN tracking area UE ID (if available), such that it can be identified by the network (e.g. the NB), which UE has sent the system information request.

For the successfully received system information request, the network (e.g. the NB) will send the required system information addressed by C-RNTI or RAN tracking area UE ID (if available) at 33.

If a collision occurs, e.g. no ACK is received at 33, the UE may back off to wait for the next round or resort to a random access-like procedure, e.g. PRACH procedure as discussed for FIG. 2b-e and as indicated at 34, to send the system information request.

The network will monitor the reserved UL grant or UL grant resource pool occasionally.

Moreover, if the network, e.g. NB, successfully receives multiple SI requests which demand the same system information at 32, the network (e.g. NB) may broadcast or groupcast the requested SI to the UEs as indicated at 35.

If the network (e.g. NB) only receives noise in the pre-allocated UL grant/resource, i.e. reserved resource pool, it can determine that (maybe) multiple UEs are sending system information requests at the same time.

In that case, the NB can broadcast some non-essential, but common system information, e.g. cell reselection system information, etc. in addition to essential system information, as indicated at 36. With such optimization, although the system information request is sent unsuccessfully because of collision, some user equipments may get demanded system information.

The scheduling of this non-essential system information can be added, e.g. in the broadcasted essential system information (e.g. also at 31). The essential system information will be broadcasted periodically, and, thus, the failed UE needs to read the essential system information and in response to detecting a scheduling information of the demanded system information, it will receive it accordingly, as indicated at 37.

It depends on the implementation in some embodiments, whether the other UEs will receive the non-essential system information or not. In some embodiments, the updated system information block index is included in the essential system information.

Hence, in some embodiments according to the embodiments of FIG. 5, signaling overhead may be low, in particular, when comparing it with the approaches of FIGS. 2a, 2b and 2d above.

The present approach may be easier to be extended for further solutions, compared, for example to the approach of FIG. 2d discussed above, since the approach of FIG. 2d may rely on the MAC CE to transmit the system information in the (P)RACH response, which is not the case in the present embodiment of FIG. 4.

When the collision occurs in the present embodiment, the network (e.g. NB) may implement an optimized solution, namely to broadcast non-essential and common system information instead, as discussed above.

Figure 6:
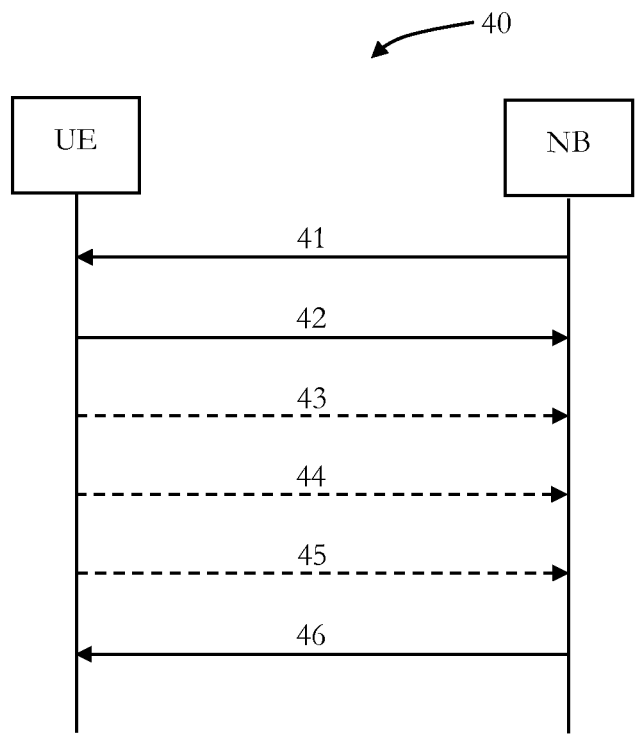
FIG. 6 is a flow diagram for a mobile telecommunications system method for on demand requesting system information of a user equipment in an RRC connected state.

FIG. 6 illustrates a mobile telecommunications system method 40 for requesting and transmitting on demand system information for a user equipment UE and a 5G new radio base station NB, wherein the UE is in a RRC connected state, as also discussed above.

At 41, the NB periodically broadcasts system information, which is, for example, essential system information in the sense as discussed above.

The UE in RRC_CONNECTED state can determine to send the system information request, based on at least one of the following events, as also indicated at 42:

1. New service request e.g. from eMBB (evolved mobile broadband) to mMTC (massive machine type communications), or start D2D (device-to-device) operation, or the like.

2. Mobility, e.g. movement from one cell coverage to another cell coverage, change of UE mobility state or the like.

3. New physical layer change, e.g. beam change, mmWave cell activated, or the like.

4. New cell is detected or powered on.

Besides the conventional explicit RRC signaling to send the system information request at 42, there are several options in other embodiments.

For example, the system information request sent at 43, may be sent via a scheduling request. The following examples are implemented in different embodiments for indicating that the request sent at 43 is the request for system information:

1) Conventional scheduling request and a zero buffer size indication in the following BSR (buffer status report), indicated at 44.

2) Re-using the conventional scheduling request bit, wherein "1" means that a conventional scheduling request is present, and "0" means scheduling information request (or vice versa). In this case, the energy detection method for scheduling request check may not be used in some embodiments. Then with the following UL grant, the UE can indicate which SIB is demanded, as indicated at 45.

3) Extending the conventional scheduling request bit to several bits, e.g. for indicating which SIB is demanded (e.g. sent in the request at 43). In this case no UL grant is needed, in some embodiments.

Moreover, the requested system information may be transmitted via a handover command from the NB at 46.

In the case that a handover procedure is triggered, the system information is transmitted via the handover command. The system information may include target cell information, e.g. essential system information for an initial access and/or it may include non-essential and common system information. It may also include special system information, such as information about the handover UE having an on-going D2D or MBMS service running, or the like. All these kinds of information may be included alone or in combination in the handover command or in a normal system information request at 46.

In some embodiments, system information transmission and reception is provided also for future communication systems and with the proposed schemes, the signaling overhead for receiving system information may be reduced and the system information transmission and reception efficiency may also be improved.

Figure 7:
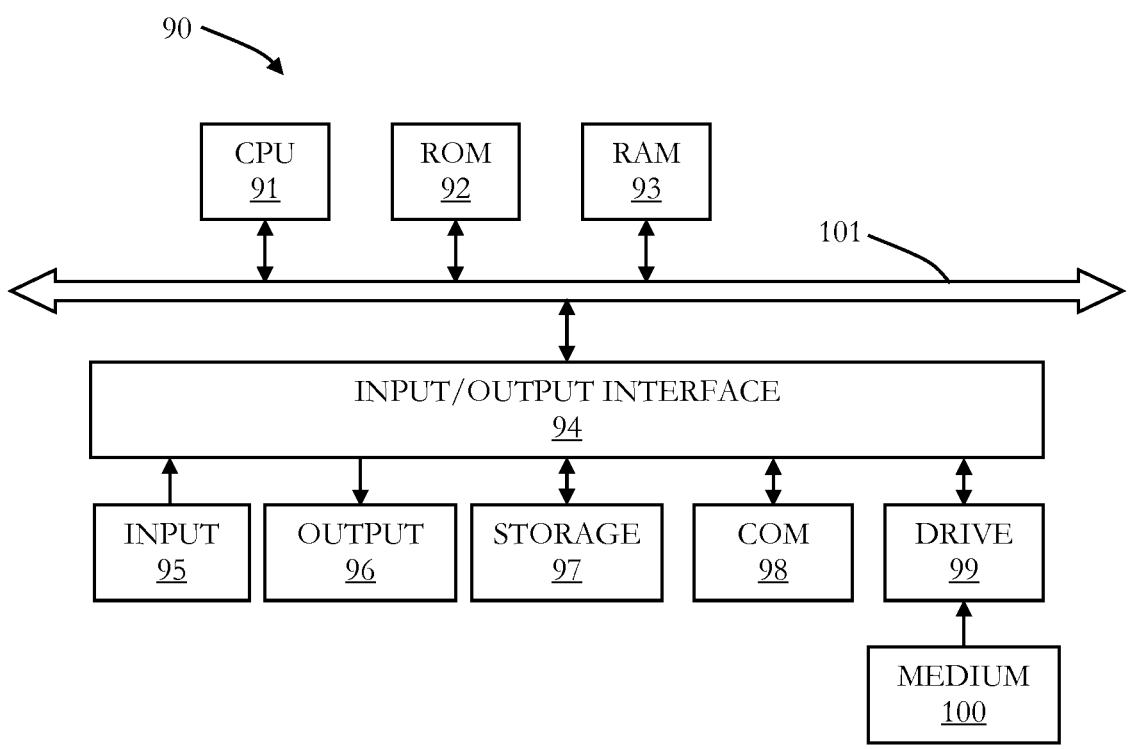
FIG. 7 schematically illustrates a computer which may be used for implementing a new radio base station or user equipment described herein.

In the following, an embodiment of a general purpose computer 90 is described under reference of FIG. 7. The computer 90 can be such implemented that it can basically function as any type of base station or new radio base station, virtual cell or user equipment as described herein. The computer has components 91 to 100, which can form a circuitry, such as anyone of the circuitries of the base station, virtual cell, slave cell, and user equipment, as described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell, and user equipment.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station the communication interface 98 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 90 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. Other changes of the ordering of method steps may be apparent to the skilled person.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mobile telecommunications system method for transmitting on demand system information to a user equipment comprising:
  requesting system information, based on a specific radio resource control connection state; and
  transmitting system information to the user equipment, based on the system information request.

(2) The mobile telecommunications system method of (1), wherein the system information is transmitted, based on the specific radio resource control connection state.

(3) The mobile telecommunications system method of (1) or (2), further comprising broadcasting essential system information including at least one of reserved uplink grant and uplink grant resource pools.

(4) The mobile telecommunications system method of anyone of (1) to (3), wherein the specific radio resource control connection state is an idle state.

(5) The mobile telecommunications system method of (4), wherein the system information is requested within a radio resource establishment procedure.

(6) The mobile telecommunications system method of (5), wherein the system information requested is included in a radio resource control connection request message.

(7) The mobile telecommunications system of anyone of (4) to (6), wherein the requested system information is transmitted within a radio resource establishment procedure.

(8) The mobile telecommunications system method of (7), wherein the requested system information is transmitted included in a radio resource control connection setup message.

(9) The mobile telecommunications system method of (1), (2) or (3), wherein the specific radio resource control connection state is at least one of an inactive state, connected state and idle state.

(10) The mobile telecommunications system method of (9), wherein an uplink resource is pre-allocated to the user equipment.

(11) The mobile telecommunications system method of (10), wherein requesting of the system information is performed contention based on the pre-allocated resource.

(12) The mobile telecommunications system method of anyone of (9) to (11), wherein the system information request includes at least one of: indication that system information is requested, indication of system information blocks, service related information, and location related information.

(13) The mobile telecommunications system method of anyone of (9) to (12), wherein the system information request includes identification information for identifying the user equipment which requests the system information.

(14) The mobile telecommunications system method of (13), wherein the requested system information transmitted to the user equipment is addressed to the user equipment based on received identification information.

(15) The mobile telecommunications system method of anyone of (9) to (14), wherein requesting of system information is repeated, if after a predetermined time period, no acknowledgment is received.

(16) The mobile telecommunications system method of anyone of (9) to (15), wherein the requested system information is broadcasted or groupcasted, if more than one system information request is received.

(17) The mobile telecommunications system method of (10) or (11), wherein in response to received noise on the pre-allocated resource, non-essential system information is broadcasted.

(18) The mobile telecommunications system method of (17), wherein the non-essential system information includes cell reselection system information.

(19) The mobile telecommunications system method of (17) or (18), further comprising broadcasting essential system information, wherein scheduling information for broadcasting the non-essential system information is included in the essential system information.

(20) The mobile telecommunications system method of (1), (2) or (3), wherein the specific radio resource control connection state is a connected state.

(21) The mobile telecommunications system method of (20), wherein requesting system information is performed upon detection of at least one of: new service request, mobility, and new physical layer change.

(22) The mobile telecommunications system method of (20) or (21), wherein the system information request is transmitted within a radio resource control signaling.

(23) The mobile telecommunications system method of anyone of (20) to (22), wherein the system information request is transmitted within a scheduling request.

(24) The mobile telecommunications system method of (23), wherein additionally to the scheduling request a zero buffer size indication is included in a buffer status report following the scheduling request.

(25) The mobile telecommunications system method of (23) or (24), wherein the scheduling request includes an indication that a system information request is transmitted.

(26) The mobile telecommunications system method of anyone of (23) to (25), wherein the scheduling request includes information about the requested system information.

(27) The mobile telecommunications system method of anyone of (20) to (26), wherein the system information request is transmitted within a handover.

(28) The mobile telecommunications system method of (27), wherein the requested system information is transmitted included in a handover command.

(29) A user equipment for a mobile telecommunications system comprising circuitry configured to:
request system information, based on a specific radio resource control connection state.

(30) The user equipment of (29), wherein the specific radio resource control connection state is an idle state.

(31) The user equipment of (30), wherein the system information is requested within a radio resource establishment procedure.

(32) The user equipment of (31), wherein the system information is requested included in a radio resource control connection request message.

(33) The user equipment of (30), wherein the specific radio resource control connection state is at least one of an inactive state, connected state and idle state.

(34) The user equipment of (33), wherein the system information is requested on a pre-allocated resource.

(35) The user equipment of (33) or (34), wherein the system information request includes at least one of: indication that system information is requested, indication of system information blocks, service related information, and location related information.

(36) The user equipment of anyone of (33) to (35), wherein the system information request includes identification information for identifying the user equipment which requests the system information.

(37) The user equipment of anyone of (33) to (36), wherein the request of system information is repeated, if after a predetermined time period, no acknowledgment is received.

(38) The user equipment of (29), wherein the specific radio resource control connection state is a connected state.

(39) The user equipment of (38), wherein requesting system information is performed upon detection of at least one of: new service request, mobility, and new physical layer change.

(40) The user equipment of (38) to (39), wherein the system information request is transmitted within a radio resource control signaling.

(41) The user equipment of anyone of (38) to (40), wherein the system information request is transmitted within a scheduling request.

(42) The user equipment of (41), wherein additionally to the scheduling request a zero buffer size indication is included in a buffer status report following the scheduling request.

(43) The user equipment of (41), wherein the scheduling request includes an indication that a system information request is transmitted.

(44) The user equipment of anyone of (41) to (43), wherein the scheduling request includes information about the requested system information.

(45) The user equipment of anyone of (38) to (44), wherein the system information request is transmitted within a handover.

(46) A base station for a mobile telecommunications system comprising circuitry configured to:
determine a radio resource control connection state of a user equipment; and
transmit system information to the user equipment, based on the system information request.

(47) The base station of (46), wherein the system information is transmitted, based on the determined radio resource control connection state.

(48) The base station of (46), wherein the circuitry is further configured to broadcast essential system information including at least one of reserved uplink grant and uplink grant resource pools.

(49) The base station of (46), (47) or (48), wherein the determined radio resource control connection state is an idle state.

(50) The base station of (49), wherein the requested system information is transmitted within a radio resource establishment procedure.

(51) The base station of (50), wherein the requested system information is transmitted included in a radio resource control connection setup message.

(52) The base station of (46), (47) or (48), wherein the determined radio resource control connection state is at least one of an inactive state, connected state and idle state.

(53) The base station of (52), wherein an uplink resource is pre-allocated to the user equipment.

(54) The base station of (53), wherein requesting of the system information is performed contention based on the pre-allocated resource.

(55) The base station of anyone of (52) to (54), wherein the requested system information transmitted to the user equipment is addressed to the user equipment based on received identification information.

(56) The base station of anyone of (52) to (55), wherein the requested system information is broadcasted or groupcasted, if more than one system information request is received.

(57) The base station of (53) or (54), wherein in response to received noise on the pre-allocated resource, non-essential system information is broadcasted.

(58) The base station of (57), wherein the non-essential system information includes cell reselection system information.

(59) The base station of (57) or (58), wherein the circuitry is further configured to broadcast essential system information, wherein scheduling information for broadcasting the non-essential system information is included in the essential system information.

(60) The base station of (46), (47) or (48), wherein the determined radio resource control connection state is a connected state.

(61) The base station of (60), wherein the requested system information is transmitted included in a handover command.

(62) A computer program comprising program code causing a computer to perform the method according to anyone of (1) to (28), when being carried out on a computer.

(63) A non-transitory computer-readable recording medium that stores therein a computer program product, which, when executed by a processor, causes the method according to anyone of (1) to (28) to be performed.

The invention claimed is:

1. A mobile telecommunications system method for transmitting on demand system information to a user equipment, the mobile telecommunications system method comprising:
first transmitting essential system information;
requesting system information, by the user equipment transmitting a system information request in direct response to receiving the essential system information, based on an idle state of the user equipment; and second transmitting a handover command, to the user equipment, based on the system information request, wherein the user equipment transmits the system information request without performing a physical random access channel (PRACH) procedure, the handover command includes the requested system information, the first transmitting is performed by periodically broadcasting the essential system information including at least one of reserved uplink grant and uplink grant resource pools, and the method further comprises broadcasting non-essential system information in a case that the system information request is received, on a pre-allocated resource, simultaneously as a second system information request is received.

2. A user equipment for a mobile telecommunications system, the user equipment comprising:

circuitry configured to:

receive a first transmission including essential system information;

transmit a system information request to the mobile telecommunications system indirect response to receiving the first transmission, based on an idle state of the user equipment; and receive a handover command, from the mobile telecommunications system and in response to the system information request, wherein the circuitry transmits the system information request without performing a physical random access channel (PRACH) procedure, the handover command includes the requested system information, the first transmission is transmitted from the mobile telecommunications system by periodically broadcasting the essential system information including at least one of reserved uplink grant and uplink grant resource pools, and in a case that the system information request is received by the mobile telecommunications system on a pre-allocated resource simultaneously as a second system information request is received by the mobile telecommunications system, the mobile telecommunications system broadcasts non-essential system information.

3. The user equipment of claim 2, wherein the system information is requested within a radio resource establishment procedure.

4. The user equipment of claim 3, wherein the system information request is included in a radio resource control connection request message.

5. The user equipment of claim 2, wherein the system information is requested on a pre-allocated resource.

6. The user equipment of claim 2, wherein the system information request includes at least one of: indication that system information is requested, indication of system information blocks, service related information, and location related information.

7. The user equipment of claim 2, wherein the system information request includes identification information for identifying the user equipment which requests the system information.

8. The user equipment of claim 2, wherein the system information request is repeated, if after a predetermined time period, no acknowledgment is received.

9. The user equipment of claim 2, wherein requesting system information is performed upon detection of at least one of: new service request, mobility, and new physical layer change.

10. The user equipment of claim 2, wherein the system information request is transmitted within a radio resource control signaling.

11. The user equipment of claim 2, wherein the system information request is transmitted within a scheduling request.

12. A base station for a mobile telecommunications system, the base station comprising:

circuitry configured to:

first transmit essential system information;

receive a system information request from a user equipment, the system information request based on a radio resource control connection state of the user equipment and being transmitted by the user equipment in direct response to the user equipment receiving the essential system information;

determine whether the radio resource control connection state of the user equipment is an idle state based on the system information request; and second transmit a handover command, to the user equipment, based on a system information request, wherein the user equipment transmits the system information request without performing a physical random access channel (PRACH) procedure, the handover command includes the requested system information, the circuitry transmits the essential system information by periodically broadcast and the essential system information includes at least one of reserved uplink grant and uplink grant resource pools, and in a case that the system information request is received, on a pre-allocated resource, simultaneously as a second system information request is received, the circuitry is further configured to broadcast non-essential system information.

* * * * *